June 11, 1968  W. A. MARSHALL  3,387,627
AUTOMATIC SHUTOFF VALVE
Filed Feb. 14, 1966
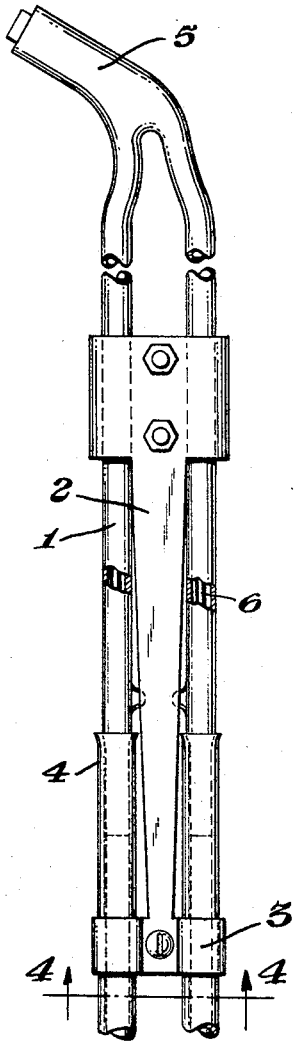
Fig. 1
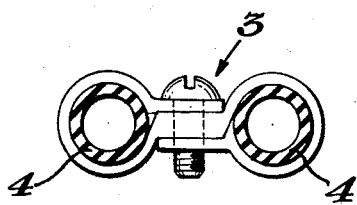
Fig. 4
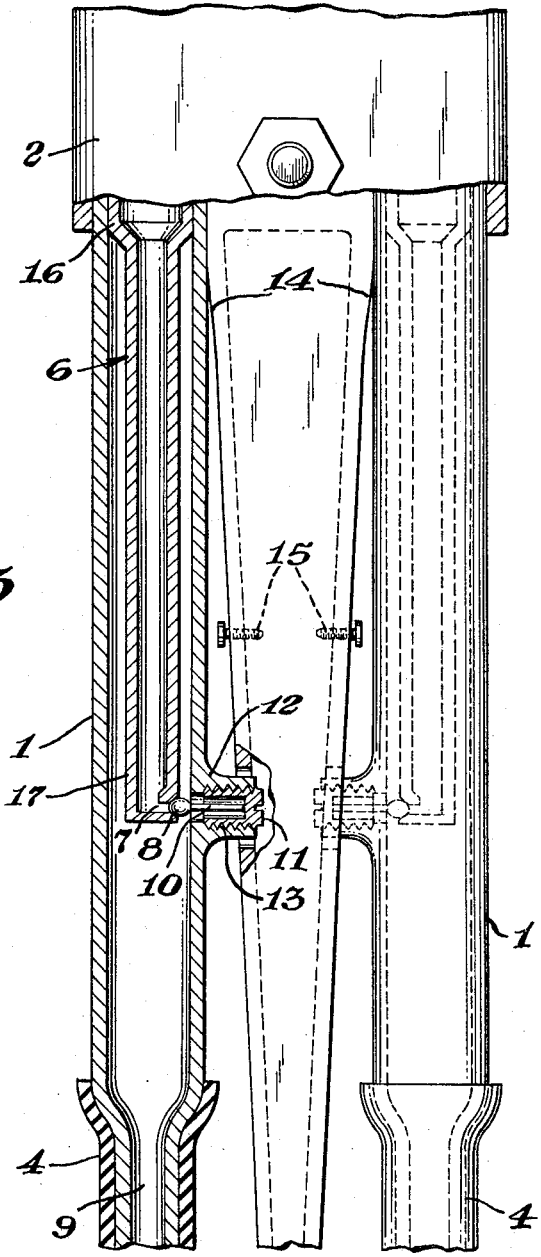
Fig. 3
Fig. 2
INVENTOR.
Wilbur A. Marshall
BY
Merlin B Davey
AGENT

United States Patent Office 3,387,627
Patented June 11, 1968

3,387,627
AUTOMATIC SHUTOFF VALVE
Wilbur A. Marshall, Midland, Mich.
(Rte. 1, Box 332–C, Aurora, Mo. 65605)
Filed Feb. 14, 1966, Ser. No. 527,179
6 Claims. (Cl. 137—594)

ABSTRACT OF THE DISCLOSURE

This invention relates to an automatic shut off valve for hand welding torches whereby the flow of gas is automatically stopped when the torch is set aside or is dropped.

---

This invention relates to a means for automatically restricting the flow of gases in a hand welding torch, and more particularly relates to a means for automatically shutting off the flame produced by a welding torch, or, if desired, reducing the flame produced by a welding torch to a pilot flame whenever the torch is set aside or is accidentally dropped, thus reducing the chance of starting fires or burning those who may be working close by.

The device of this invention may be used with either a single combustible material such as a simple gas flame, or it may be employed with more complex systems such as are utilized in gas-oxygen flames, e.g. oxyacetylene torches.

The novel means of this invention comprises a welding torch handle which includes a safety shutoff valve which is positioned within the handle without resorting to the conventional means of piercing the wall of the gas passage with a moveable pin to form a link between the door of a valve inside and a handle or lever outside of the passage wall, which devices require packing glands or the like to insure a leak proof construction.

This invention will be further understood by reference to the accompanying drawings wherein FIG. 1 is a side view of one embodiment of the device of this invention; FIG. 2 is a detailed sectional view showing a portion of the device of this invention, FIG. 3 is a cross-sectional view of one of the tubular elements which is fitted with a handle-forming jacket, and FIG. 4 is a cross-sectional view taken along the line 4—4 of FIG. 1.

Referring to FIG. 1, this invention is seen to comprise, in a preferred embodiment, a pair of resilient metal tubes 1, which are in a generally parallel arrangement and are anchored at one of their ends to a rigid frame 2 which is disposed between the resilient metal tubes in such manner as to allow a slight movement of each resilient tube and which extends somewhat beyond the free ends of the resilient tubes. A conventional welding torch head 5 is attached, by means not shown, to the fixed ends of the resilient metal tubes. The free end of the rigid frame is formed into the shape of hose clamps 3 which are in alignment with the resilient metal tubes 1. Hoses 4 are fitted through the hose clamps 3 and onto the free ends 9 of the resilient metal tubes 1. Sufficient space is provided between hose clamps 3 and the terminal ends of tubes 1 to permit a slight movement of said tubes due to the flexibility of the gas hose.

As best seen in FIG. 2, a second, rigid or stationary tube 6 is disposed within each of resilient tubes 1. Tube 6 has an enlarged first portion 16 which is tightly and sealingly fitted within tube 1 at the portion of tube 1 which is securely fixed to frame 2. Tube 6 has a second portion 17 which has an external diameter small than the internal diameter of tube 1, and which terminates in a side orifice 7 which is adapted to mate with the male and moving part of the valve assembly which is a short metal tang 10 formed at one end into a head 8, the other end being secured to a threaded metal plug 11 which is tightly and securely fitted into boss 12, which is formed on the exterior wall of tube 1, by means of threads 13. Frame 2 is constructed with a recess or other means so as to permit the necessary movement of tubes 1 without contacting boss 12. The length of threads 13 is sufficient to allow for depth adjustment, during manufacture, and to insure that head 8 and orifice 7 are in sealing contact when tube 1 is in its normal position, if complete shut off is desired, or that only sufficient gas passes through to maintain a small pilot flame. It is readily seen that, if desired, the oxygen supply to a gas-oxygen flame may be shut off completely, while the gas supply may be reduced to the minimum required for a pilot flame.

In a preferred embodiment of the present invention frame 2 is designed so as to present a smoothly curved ledge 14 along that portion of the frame immediately adjacent the point of attachment of resilient tubes 1. Curved ledge 14 serves to distribute the bend resulting when resilient tubes 1 are pushed toward the frame and each other by a slight hand pressure, thus allowing gas and oxygen to flow into stationary tubes 6 and thence into torch head 5.

In another embodiment, adjustable bumpers, such as set screws 15, may be positioned in frame 2 whereby the limit of movement of either one or both tubes 1 may be controlled, thereby changing the amount the valves are opened by the hand pressure.

It is readily seen that the device, as shown, can be employed in torches using only one gas, requiring only one valve tube, by simply letting one tube serve only as part of the handle or, alternatively, by dispensing with one side altogether and maintaining only the other side in attachment with the frame.

In construction, the metal tubes 1, which may be made of any thin wall resilient metal, for example spring steel or antenna brass, need not be round. The tubes may be designed to provide a more comfortable hand grip, or, if desired, a supplementary jacket 20, such as shown in FIG. 3, may be fitted over tube 1 in order to provide the proper handle. Stationary tubes 6 may be made of any suitable metal such as stainless steel or hard brass. Tubes 1 and 6 are preferably made of a corrosion resistant material.

The sizes of the tubes employed is not critical, it being only necessary that there is sufficient clearance between the second portions of tubes 1 and 6 to allow for the disengagement of orifice 7 and head 8 and that the tubes and frame are of a size which is readily held in the hand. Tube 1 advantageously has an outside diameter of about ⅜ inch and a wall thickness of $\frac{1}{32}$ inch or less. The overall width of the tubes and frame 2 when assembled is advantageously from about 1½ to 2 inches.

In operation one has only to pick up the handle and apply a gentle hand pressure whereby tubes 1 are simultaneously moved toward each other and orifices 7 are opened, allowing gas and oxygen, if desired, to pass to the torch head 5. In the event of an emergency of any sort, the mere release of the hand grip allows the tubes 1 to return to their normal position, thereby sealing orifices 7 with knobs 8, or, if so constructed, reducing the passage of gas to that amount which will simply support a pilot flame.

It is thus seen that this invention provides an automatic shutoff valve wherein no part of the assembly wall has to collapse or yield inwardly, no other hand motion is required than a slight increase in the normal gripping action, and the automatic shut-off operates by the simple release of the holding action, regardless of into what position the torch may fall or be set.

Various modifications may be made in the present invention without departing from the spirit or scope thereof, and it is understood that I limit myself only as defined in the appended claims.

I claim:

1. Device for automatically restricting the flow of gas in a hand welding torch comprising at least one resilient metal tube having a first end and a second end, said first end being fixedly attached to a first end of a rigid frame which is disposed generally parallel to said resilient tube, said resilient tube having a tang disposed in the interior wall toward said second end and in juxtaposition to said rigid frame and having a stationary metal tube disposed therein, said stationary metal tube having a first portion and a second portion, said first portion being tightly and sealingly fitted within said first end of said resilient ube, said second portion having a smaller external dimension and being disposed toward said second end of said resilient tube and terminating in an orifice facing said tang and which mates with said tang when said welding torch is not being used, said at least one tube forming at least one portion of the handle of said welding torch, whereby the tang and orifice are separated by applying hand pressure to said handle portion and said tang and orifice mate when said hand pressure is released.

2. Device of claim 1, comprising a pair of resilient metal tubes in parallel arrangement and forming at least a portion of the handle of said welding torch, each tube having a first end and a second end, and having a tang disposed in the interior juxtaposed walls toward said second end, said first end of each of said tubes being fixedly attached to a first end of a rigid frame, said frame being disposed in parallel arrangement between said pair of metal tubes and having a second end extending beyond said second ends of said pair of metal tubes, each of said resilient tubes having a stationary metal tube having a first portion and a second portion disposed therein, said first portion being tightly fitted within said first end of said resilient tube, said second portion having a smaller external dimension and being disposed toward the second end of said resilient tube and terminating in an orifice facing said tang and which mates with said metal tang when said welding torch is not being used.

3. Device of claim 2 wherein said frame is fitted with adjustable rests for limiting the movement of the resilient tubes.

4. Device of claim 2 wherein said frame has a convex curved configuration immediately adjacent the point of attachment of the resilient tubes and disposed toward said tubes.

5. Device of claim 2 wherein each of said tangs is secured to a metal plug fixedly disposed in each of said resilient tubes.

6. Device of claim 5 wherein the metal plug is a threaded metal plug.

References Cited

UNITED STATES PATENTS

| | | | |
|---|---|---|---|
| 223,326 | 1/1880 | Emerton. | |
| 479,391 | 7/1892 | Adams | 251—342 |
| 2,213,748 | 9/1940 | Stettner | 158—27.4 |
| 2,548,933 | 4/1951 | Barnett | 137—606 XR |

HENRY T. KLINKSIEK, *Primary Examiner.*